United States Patent Office 3,398,399
Patented Aug. 20, 1968

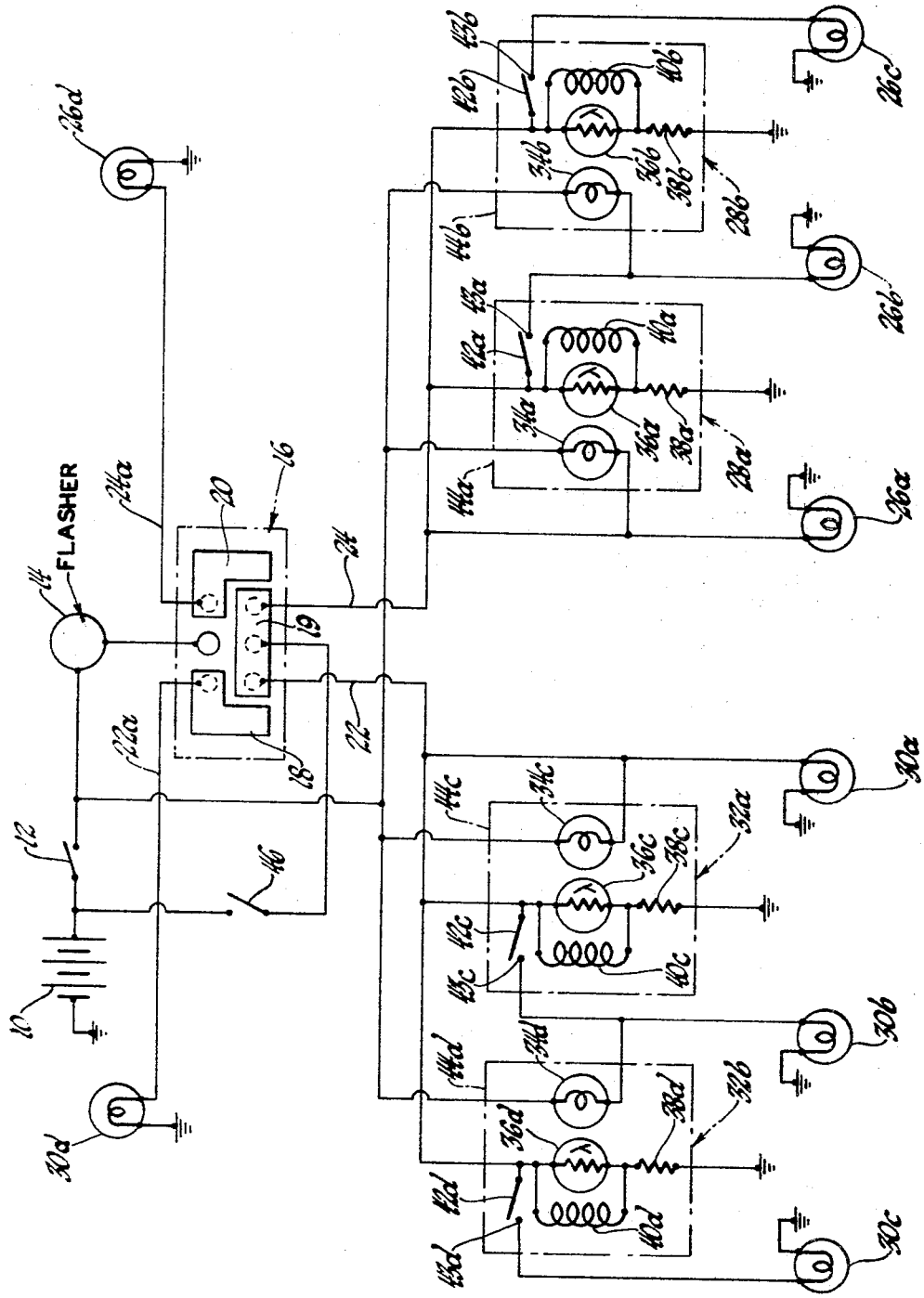

3,398,399
VEHICLE SEQUENTIAL SIGNALING SYSTEM
Eugene W. Brock, Anderson, Ind., assignor to General Motors Corporation, Detroit, Mich., a corporation of Delaware
Filed Sept. 23, 1965, Ser. No. 489,532
4 Claims. (Cl. 340—82)

This invention relates to signaling systems and more particularly to a motor vehicle signaling system for sequentially energizing a plurality of turn signal lamps in the direction of the intended turn.

Sequential turn signal systems shown in the prior art are characterized by complexity of design and generally require rotating contactors for progressively connecting a plurality of lamps to the vehicle battery. Such arrangements are expensive and subject to wear and eventual breakdown because of their numerous movable elements.

The disadvantages of the prior art are obviated by the present invention wherein a relatively simple and inexpensive signaling system is provided which includes a plurality of photoelectric time delay elements interconnected with the vehicle turn signal system for sequentially energizing the turn signal lamps.

A more complete understanding of the present invention may be had from the following detailed description which should be read in conjunction with the single drawing which illustrates a schematic diagram of the turn signal system of the present invention.

Referring now to the single drawing, a source of voltage 10, preferably the vehicle battery, is connected through an ignition switch 12 to the input terminal of a conventional flasher 14. The output terminal of the flasher 14 is connected with a conventional turn signal switch 16. The turn signal switch 16 comprises movable bridging conductors 18, 19 and 20 adapted when moved to an operated position to selectively connect the output of the flasher to conductors 22 and 24, respectively. Right turn indicating lamps 26a through 26c are adapted to be sequentially energized through the conductor 24 by operation of delay circuitry generally designated 28a and 28b. Left turn indicating lamps 30a through 30c are adapted to be sequentially energized by connection to conductor 24 through operation of delay circuitry generally designated 32a and 32b. A right front turn signaling lamp 26d and a left front turn signaling lamp 30d are connected respectively to conductors 24a and 22a.

The networks 28a, 28b, and 32a, 32b comprise pilot lamps 34a–34d, light dependent resistors 36a–36d, fixed resistors 38a–38d, and relays 40a–40d. Each of the relays 40a–40d includes armatures 42a–42d and stationary contacts 43a–34d. The elements of the delay networks 28a, 28b and 32a, 32b are enclosed within a light tight compartment 44a–44d. A brake switch 46 is connected in parallel with the flasher 14 and the turn signal switch 16 and applies battery voltage to the conductors 22 and 24 when the brake pedal is depressed.

With the ignition switch 12 closed, the pilot lamps 34a–34d are connected in series with signal lamps 26a, 26b, 30a, and 30b, respectively, across the battery 10. The pilot lamps 34a–34d will therefore be energized; however, the current flow through the series circuit is insufficient to energize the signal lamps 26a, 26b, 30a and 30b. If now a right turn signal is to be indicated, the bridging member 20 is moved to the left to connect the output of the flasher to the conductors 24 and 24a. This shorts the pilot lamp 34a and energizes the signal lamp 26a. As the filament of the pilot lamp 34a cools, the resistance of the light dependent resistor 36a increases until the pickup voltage of the relay 40a is reached. When this occurs, the armature 42a closes the normally open contact 43a to connect the signal lamp 26b in parallel with the signal lamp 26a. Closure of the armature 42a shunts the pilot lamp 34b which after a time delay lowers the resistance of the light dependent resistor 36b causing the relay 40b to pull in and connect the signal lamp 26c in parallel with the signal lamps 26a and 26b. At this point, the signal lamps 26a–26c are energized and the flasher 14 interrupts current flow causing all the lamps to be deenergized. The cycle is repeated upon the subsequent closure of the flasher 14. It will be apparent that the left rear signal lamps 30a–30c may be operated in a similar manner by closure of the bridging contact 18. At the start of the off cycle of the flasher, the signal lamps 26a–26c are turned off simultaneously. With voltage removed from the signal lamps, pilot lamps 34a and 34b are energized and the system is ready for another cycle of operation.

Closure of the brake pedal position responsive switch 46 causes voltage to be applied to both sides of the system. Both the left and right turn signal lamps go through one sequence of operation after which all lamps remain on until the switch 46 is released.

The pilot lamps 34a–34d are situated in a fail safe mode, that is if a pilot lamp should burn out the signal lamps will continue to operate but there will be no time delay in the network affected.

While the invention has been described with regards to a preferred embodiment thereof, this should not be construed in a limiting sense. Modifications and variations will now occur to those skilled in the art. For a definition of the invention, reference is made to the appended claims.

What is claimed is:
1. A circuit for sequentially energizing first and second load devices comprising a source of voltage,
   delay means comprising a light dependent resistor and a fixed resistor connected in series across said first load device,
   relay means connected in parallel with said light dependent resistor,
   a lamp for illuminating said light dependent resistor,
   said lamp and said light dependent resistor being enclosed in a light tight compartment,
   said lamp being connected in series with said first load device,
   switching means for shunting said lamp and connecting said first load device directly to said source,
   said relay means including contact means connecting said second load device in parallel with said first load device when said relay is energized.
2. A sequential turn signaling system for a motor vehicle comprising a source of voltage,
   a turn signal switch,
   flasher means connecting said turn signal switch in series with said source,
   first, second and third turn signal lamps, first and second pilot lamps and first and second light dependent resistors enclosed within first and second light tight compartments respectively,
   first and second relay means connected in parallel with said first and second light dependent resistors respectively,
   said first turn signal lamp being connected in series with said turn signal switch,
   said first and second pilot lamps being connected in parallel with said flasher means and said turn signal switch and in series with said first and second turn signal lamps respectively,
   said first and second relay means including contact means for respectively connecting said second and third turn signal lamps in parallel with said first turn signal lamp when said relay means are energized.

3. The system defined in claim 2 being further defined by a first and second fixed resistor connected in series with said first and second relay means respectively.

4. The system defined in claim 3 being further defined by a brake pedal position responsive switch connected in parallel with said flasher and said turn signal switch.

No references cited.

JOHN W. CALDWELL, *Primary Examiner.*

ALVIN WARING, *Assistant Examiner.*